United States Patent
Johno et al.

(10) Patent No.: US 9,360,790 B2
(45) Date of Patent: Jun. 7, 2016

(54) OPTICAL SCANNING DEVICE AND IMAGE FORMING APPARATUS

(71) Applicants: Hiroshi Johno, Kanagawa (JP);
Yoshinobu Sakaue, Kanagawa (JP);
Kazunori Watanabe, Tokyo (JP);
Susumu Narita, Kanagawa (JP)

(72) Inventors: Hiroshi Johno, Kanagawa (JP);
Yoshinobu Sakaue, Kanagawa (JP);
Kazunori Watanabe, Tokyo (JP);
Susumu Narita, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/708,343

(22) Filed: May 11, 2015

(65) Prior Publication Data
US 2015/0331350 A1 Nov. 19, 2015

(30) Foreign Application Priority Data

May 13, 2014 (JP) ................................ 2014-099277

(51) Int. Cl.
*G03G 15/04* (2006.01)
*G02B 26/10* (2006.01)
*G02B 26/12* (2006.01)

(52) U.S. Cl.
CPC ............... *G03G 15/04* (2013.01); *G02B 26/10* (2013.01); *G02B 26/12* (2013.01)

(58) Field of Classification Search
CPC . G03G 15/04; G03G 15/04036; G02B 26/10; G02B 26/12
See application file for complete search history.

(56) References Cited

U.S. PATENT DOCUMENTS

| 3,451,503 | A  | * | 6/1969  | Twomey  | H01F 27/33 181/202 |
|---|---|---|---|---|---|
| 7,215,783 | B2 | * | 5/2007  | Tsunoda | H04R 29/001 381/56 |
| 2006/0050346 | A1 | * | 3/2006  | Kim | B41J 2/471 359/204.1 |
| 2010/0091083 | A1 | * | 4/2010  | Itami | B41J 2/471 347/261 |
| 2011/0187769 | A1 | * | 8/2011  | Hiraide | H04N 1/04 347/5 |
| 2015/0110517 | A1 | * | 4/2015  | Ishida | G03G 21/206 399/91 |
| 2015/0241838 | A1 | * | 8/2015  | Ishida | G10K 15/04 399/91 |
| 2015/0243274 | A1 | * | 8/2015  | Hirakawa | G03G 21/00 399/91 |
| 2015/0338761 | A1 | * | 11/2015 | Watanabe | G03G 15/04 347/118 |

FOREIGN PATENT DOCUMENTS

| JP | H06-051228 | 2/1994 |
| JP | 2005-202117 | 7/2005 |

* cited by examiner

*Primary Examiner* — David Gray
*Assistant Examiner* — Carla Therrien
(74) *Attorney, Agent, or Firm* — Harness, Dickey & Pierce, P.L.C.

(57) ABSTRACT

An optical scanning device that performs optical scanning across an object to be scanned with a light deflected, comprises: a deflection unit that causes a deflection mirror driven by a driving source to deflect the travel direction of light emitted from a light source and generates the light deflected; a resonator that includes a resonance space for reducing sound emitted from the deflection unit and a resonance passage communicating with the resonance space to direct sound from outside to inside the resonance space; a housing that accommodates the deflection unit and the resonator, and a partition wall that partitions a deflection unit accommodating space acting as a space for accommodating the deflection unit in the housing and a resonator accommodating space acting as a space for accommodating the resonator in the housing.

12 Claims, 8 Drawing Sheets

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2014-099277 filed in Japan on May 13, 2014.

BACKGROUND OF THE INVENTION

1. Field of the Invention

The present invention relates to an optical scanning device which has deflection unit for deflecting, by a deflection mirror driven by a driving source, the travel direction of light emitted from a light source and which employs the light deflected by the deflection unit to perform optical scanning on an object to be scanned. The invention also relates to an image forming apparatus that includes the optical scanning device.

2. Description of the Related Art

Conventionally, an optical deflector disclosed in Japanese Patent Application Laid-open No. H6-51228 is known as deflection unit to be used for an optical scanning device of this type. The optical deflector allows a polygonal mirror shaped like a regular hexagonal prism to deflect the travel direction of a laser beam emitted from a laser light source, the polygonal mirror serving as a deflection mirror rotated by a drive motor acting as a driving source. In such a structure, the sound of wind produced by the rotating polygonal mirror may be turned into a noise. To reduce the wind noise, the optical deflector disclosed in Japanese Patent Application Laid-open No. H6-51228 is configured such that a resonance box which resonates at the resonance frequency that is the same as the frequency of the wind noise produced by the polygonal mirror is integrated with the housing that holds the polygonal mirror and the drive motor. This allows the wind noise produced by the rotating polygonal mirror to be attenuated by the resonance of the resonance box serving as a resonator, thereby preventing the noise from occurring due to the wind noise.

However, with this optical deflector, there was a possibility that an airflow produced by the rotation of the polygonal mirror hit the inlet of the resonance passage for guiding sound to the resonance space of the resonance box, thereby producing another noise like whistle sound (hereafter referred to as the whistle-like noise). In an attempt to reduce the whistle-like noise, provision of an additional resonance box having the same resonance frequency as the frequency of the whistle-like noise would lead to an increase in costs.

In view of the aforementioned background, there is a need to provide the following optical scanning device and an image forming apparatus that includes the optical scanning device. That is, provided is the optical scanning device which can avoid an increase in costs caused by an additional resonator to be provided to reduce a whistle-like noise while an increase in noise due to the whistle-like noise produced at the inlet of the resonance passage of the resonator is being avoided.

SUMMARY OF THE INVENTION

It is an object of the present invention to at least partially solve the problems in the conventional technology.

According to the present invention, there is provided an optical scanning device that performs optical scanning across an object to be scanned with a light deflected, the optical scanning device comprising: a deflection unit that causes a deflection mirror driven by a driving source to deflect the travel direction of light emitted from a light source and generates the light deflected; a resonator that includes a resonance space for reducing sound emitted from the deflection unit and a resonance passage communicating with the resonance space to direct sound from outside to inside the resonance space; and a housing that accommodates the deflection unit and the resonator, wherein the optical scanning device further comprises a partition wall that partitions a deflection unit accommodating space acting as a space for accommodating the deflection unit in the housing and a resonator accommodating space acting as a space for accommodating the resonator in the housing, the partition wall causing that sound produced in the deflection unit accommodating space is allowed to reach an inlet of the resonance passage of the resonator via the partition wall and an air gap in the deflector accommodating space.

The present invention also provides an image forming apparatus comprising: a photoconductor; the above-described optical scanning device; and developing means for developing the latent image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Now, a description will be made to an embodiment of a copier 500 as an example of an image forming apparatus to which the present invention is applied. Note that the copier 500 according to the embodiment forms only monochrome images. However, the present invention can also be applied even to an image forming apparatus that forms multi-color images like full-color images.

First, a description will be made to the basic structure of the copier 500 according to the embodiment.

Figure 1:
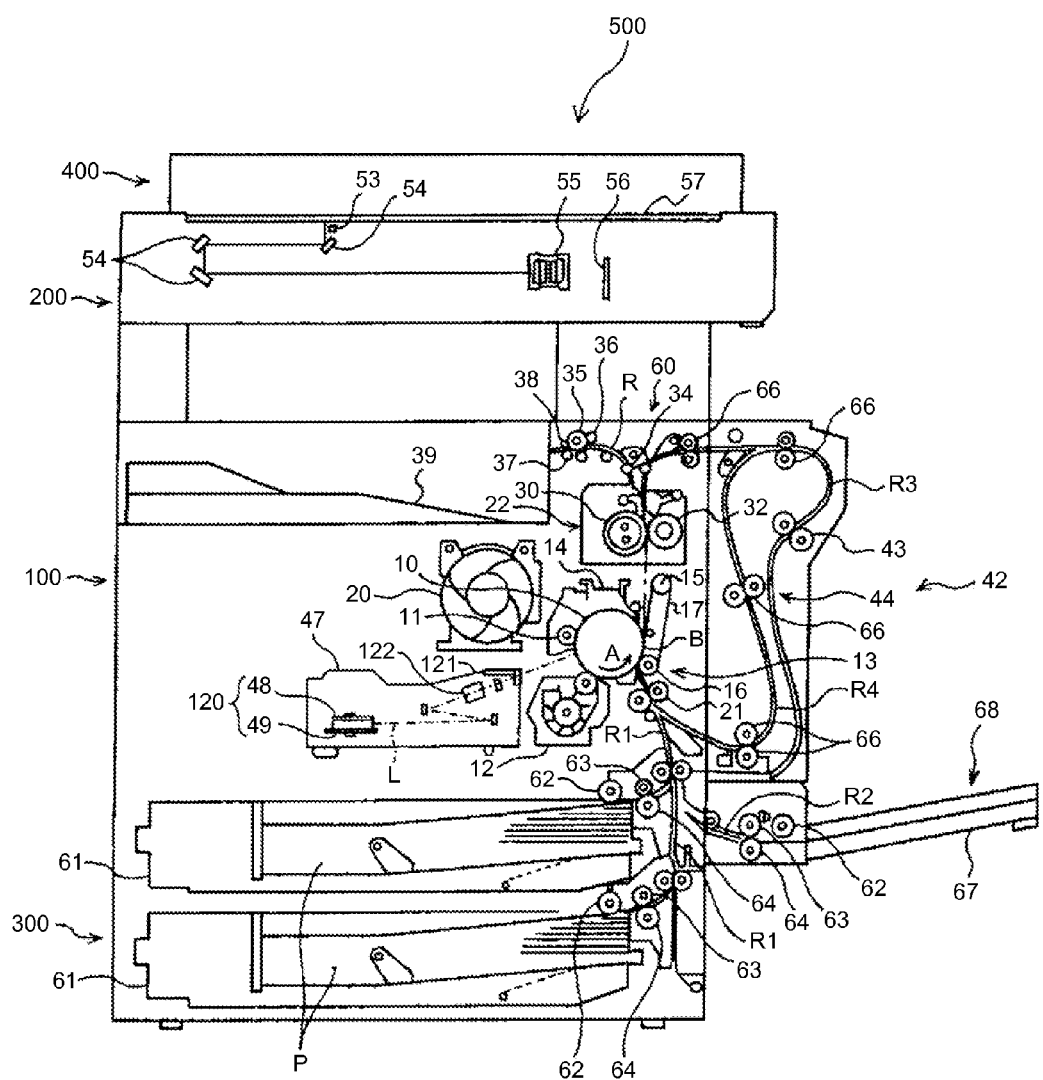
FIG. 1 is a view schematically illustrating the configuration of a copier according to an embodiment of the present invention.

FIG. 1 is a schematic view illustrating the configuration of the copier 500 according to the embodiment. The copier 500 mainly includes a printer unit 100, an image reading device 200, a recording sheet bank 300, and an automatic document feeder 400. The printer unit 100 is placed immediately above the recording sheet bank 300, and the image reading device 200 is secured immediately above the printer unit 100. Then, the automatic document feeder 400 is mounted immediately above the image reading device 200, and is pivoted with a fulcrum at a hinge provided on the rear side (on the back side in the direction orthogonal to the surface of the figure), thereby being opened or closed with respect to the contact glass of the image reading device 200.

Inside the printer unit 100, a drum-shaped photoconductor 10 serving as a latent image bearer, a charging device 11, a developing device 12, a transfer unit 13, a cleaner 14, a toner supplying device 20, and a fixing device 22 are provided. Around the photoconductor 10 on which toner images are formed, the charging device 11 with a charging roller, the developing device 12, the transfer unit 13, and the cleaner 14 are disposed. Of these components, the photoconductor 10, the charging device 11, the developing device 12, and the cleaner 14 are constructed as a process cartridge that is integrally detachably attached to the printer unit 100 while being held by a common holding structure.

The developing device 12 develops an electrostatic latent image on the photoconductor 10 using a toner carried on the surface of a developing roller serving as a developer bearer and thereby forms a toner image on the surface of the photoconductor 10. Furthermore, the transfer unit 13 has a transfer downstream roller 15 and a transfer upstream roller 16, which are disposed inside the loop thereof, and a transfer belt 17 which is stretched over these two rollers and endlessly moves in a clockwise direction in the figure. The transfer belt 17 is brought into contact with the peripheral surface of the photoconductor 10 at a transfer position B so as to form transfer nips.

On the left of the charging device 11 and the cleaner 14 in the figure, the toner supplying device 20 that supplies additional toner to the developing device 12 is provided. Furthermore, a recording sheet transfer device 60 is provided on the right end of the printer unit 100 in the figure. The recording sheet transfer device 60 transfers, upwardly from vertically below, a recording sheet P fed from a recording sheet cassette 61 in the recording sheet bank 300. The recording sheet transfer device 60 passes the recording sheet P, which has been fed through a sheet conveying path R1 and a sheet conveying path R2, through the transfer position B and the recording sheet conveying path R and then transfers the recording sheet P to a stack unit 39 along a recording sheet conveying path R. A pair of registration rollers 21 are provided upstream of the transfer position B on the recording sheet conveying path R in the transfer direction. On the other hand, the fixing device 22 is provided downstream of the transfer position B in the transfer direction.

The fixing device 22 forms fixing nips by bringing a heating roller 30 serving as a heating member into contact with a pressure applying roller 32 serving as a pressure applying member and fixes a toner image onto the surface of the recording sheet P by heating and applying pressure to the recording sheet P sandwiched between the fixing nips. An ejection bifurcating claw 34, an ejection roller 35, a first pressure applying roller 36, a second pressure applying roller 37, a stiffening roller 38, etc. are disposed downstream of the fixing device 22 in the transfer direction of the recording sheet. Also disposed is the stack unit 39 that stacks the recording sheet P which has been passed through the fixing device 22 and has an image fixed thereon.

On the left of the developing device 12 in the figure, an optical scanning device 47 is disposed. The optical scanning device 47 has a polygon scanner 120 serving as deflection unit which includes a polygon mirror 48 acting as a deflection mirror and a polygon motor 49 acting as a driving source. The optical scanning device 47 also includes a laser light source (not shown) and a scanning optical system such as an fθ lens 122. On the right side of the printer unit 100 in the figure, a switchback device 42 is provided. The switchback device 42 conveys the recording sheet P along an inverting path R3 branched from the position, at which the ejection bifurcating claw 34 is disposed on the recording sheet conveying path R, and along a re-conveying path R4 for guiding the recording sheet P back to the position of the pair of registration rollers 21 on the recording sheet conveying path R. The pair of switchback rollers 43 and a plurality of other pairs of recording sheet conveying rollers 66, etc. are disposed on the inverting path R3 and the re-conveying path R4.

The image reading device 200 includes a reading light source 53, a plurality of mirrors 54, an image-forming optical lens 55, and an image sensor 56 such as a CCD sensor, and there is provided contact glass 57 on the upper surface of the image reading device 200. Furthermore, the automatic document feeder 400 is provided with, for example, a document feeder tray (not shown) and a document stack tray (not shown) to which the document is ejected. The automatic document feeder 400 includes a plurality of document conveying rollers, which convey the document from the document feeder tray through the reading position on the contact glass 57 of the image reading device 200 to the document stack tray.

Inside the recording sheet bank 300, a plurality of recording sheet cassettes 61 stacked in layers for storing the recording sheet P such as pieces of recording paper or OHP film are provided. The respective recording sheet cassettes 61 are provided with a pick-out roller 62, a sheet feeding roller 63, and a separation roller 64.

On the right of the recording sheet cassettes 61 in the figure, the aforementioned sheet conveying path R1 that communicates with the recording sheet conveying path R of the printer unit 100 is formed. The sheet conveying path R1 is also provided with certain pairs of recording sheet conveying rollers 66 for conveying the recording sheet P. Furthermore, a manual sheet feeding unit 68 is provided on the right of the recording sheet bank 300 in the figure. The manual sheet feeding unit 68 is provided with a manual feed tray 67 that can be freely opened or closed and has the aforementioned manual sheet conveying path R2 formed to guide, to the recording sheet conveying path R, the manually fed recording sheet P placed on the manual feed tray 67. Like the recording sheet cassettes 61, the manual sheet feeding unit 68 is also provided with the pick-out roller 62, the sheet feeding roller 63, and the separation roller 64.

To make a copy using the copier 500, first, a main switch (not shown) is turned ON. Then, an unstitched document would be placed on the document feeder tray of the automatic document feeder 400. On the other hand, for a book document with one side stitched, the automatic document feeder 400 is opened to place the document on the contact glass 57 of the image reading device 200, and then the automatic document feeder 400 is closed to push the document against the contact glass 57. Then, when the start switch (not shown) is depressed, the document placed on the automatic document feeder 400 is passed across the contact glass 57 when the document is transported through the document conveying paths by the document conveying rollers of the automatic document feeder 400. At this time, after the image of the document is read by the image reading device 200, the document is ejected onto the document stack tray of the automatic document feeder 400. On the other hand, for the document with one side stitched which is pushed against the contact glass 57, the image on the document is read by driving the image reading device 200. At this time, while the reading light source 53 is being moved across the contact glass 57, the image reading device 200 irradiates the surface of the document on the contact glass 57 with light from the reading light source 53. Then, the reflected beam of light is guided by the plurality of mirrors 54 to the image-forming optical lens 55 and impinges upon the image sensor 56, so that the image sensor 56 reads the document image.

When the document image starts to be read, the printer unit 100 drives a photoconductor drive motor (not shown) to rotate the photoconductor 10 in a counterclockwise direction in the figure. Then, while the surface of the photoconductor 10 is being uniformly charged by the charging device 11, the optical scanning device 47 performs optical scanning on the surface of the photoconductor 10 that has been charged. This optical scanning causes the area irradiated with a laser beam L on the surface of the photoconductor 10 to be attenuated in terms of potential and become an electrostatic latent image. The electrostatic latent image is turned to a toner image by applying a toner to and thereby visualizing the electrostatic latent image by the developing device 12.

On the other hand, by being triggered when the aforementioned start switch is depressed, one of the plurality of recording sheet cassettes 61, which is pre-selected by the user, in the recording sheet bank 300 feeds recording sheets P by the pick-out roller 62. The fed recording sheets P are separated into one sheet when being passed through the separation nips made up of the sheet feeding roller 63 and the separation roller 64 which are in contact with each other, and then after being guided onto the sheet conveying path R1, the one sheet is guided onto the recording sheet conveying path R by the pair of recording sheet conveying rollers 66. After that, the sheet is stopped when hitting the pair of registration rollers 21. Note that when having selected the manual sheet feeding unit 68, the user places the recording sheet P on the opened manual feed tray 67. In this case, after being fed by the pick-out roller 62, the recording sheets P are separated into one sheet by the sheet feeding roller 63 and the separation roller 64, and the one sheet is conveyed to the manual sheet conveying path R2. Subsequently, after being guided by the pair of recording sheet conveying rollers 66 onto the recording sheet conveying path R, the sheet is stopped when hitting the pair of registration rollers 21.

The recording sheet P that has hit the pair of registration rollers 21 in this manner is fed by the pair of registration rollers 21 to the transfer nips (the transfer position B) at the timing in synchronism with a toner image on the surface of the photoconductor 10 at the aforementioned transfer nips. Then, after the toner image on the photoconductor 10 has been transferred to the recording sheet P by the transfer unit 13, the recording sheet P is discharged from the transfer nips.

Residual transfer toner is left on the surface of the photoconductor 10 having passed through the transfer nips. The residual transfer toner is removed from the surface of the photoconductor 10 by the cleaner 14. After the surface of the photoconductor 10 has been cleaned, charges on the surface are removed by a discharge lamp (not shown), and thereafter, the surface is uniformly charged again by the charging device 11.

Furthermore, the recording sheet P having passed through the transfer nips is conveyed on the transfer belt 17 to the fixing device 22. Then, inside the fixing device 22, the toner image is fixed to the surface of the recording sheet P when the recording sheet P is heated and pressurized while being sandwiched between the fixing nips provided by the heating roller 30 and the pressure applying roller 32 in contact with each other.

The recording sheet P with the toner image fixed in this manner is discharged from the fixing device 22, and then ejected to and stacked on the stack unit 39 after having been sequentially passed through the ejection roller 35, the first pressure applying roller 36, the second pressure applying roller 37, and the stiffening roller 38.

When a two-sided printing mode is selected to form an image on both surfaces of the recording sheet P, the recording sheet P with a toner image fixed only on one surface is conveyed out of the fixing device 22 and then guided to the inverting path R3 by the ejection bifurcating claw 34. Then, after having been brought to a switchback position 44 by the pair of recording sheet conveying rollers 66, the recording sheet P is allowed to switchback by the pair of switchback rollers 43 to be then guided to the re-conveying path R4. Subsequently, after having been guided back to the recording sheet conveying path R by the pair of recording sheet conveying rollers 66, a toner image is transferred at the transfer nips to the other surface of the recording sheet P via the pair of registration rollers 21. Subsequently, as in the one-sided printing mode, the recording sheet P is ejected onto the stack unit 39.

Figure 2:
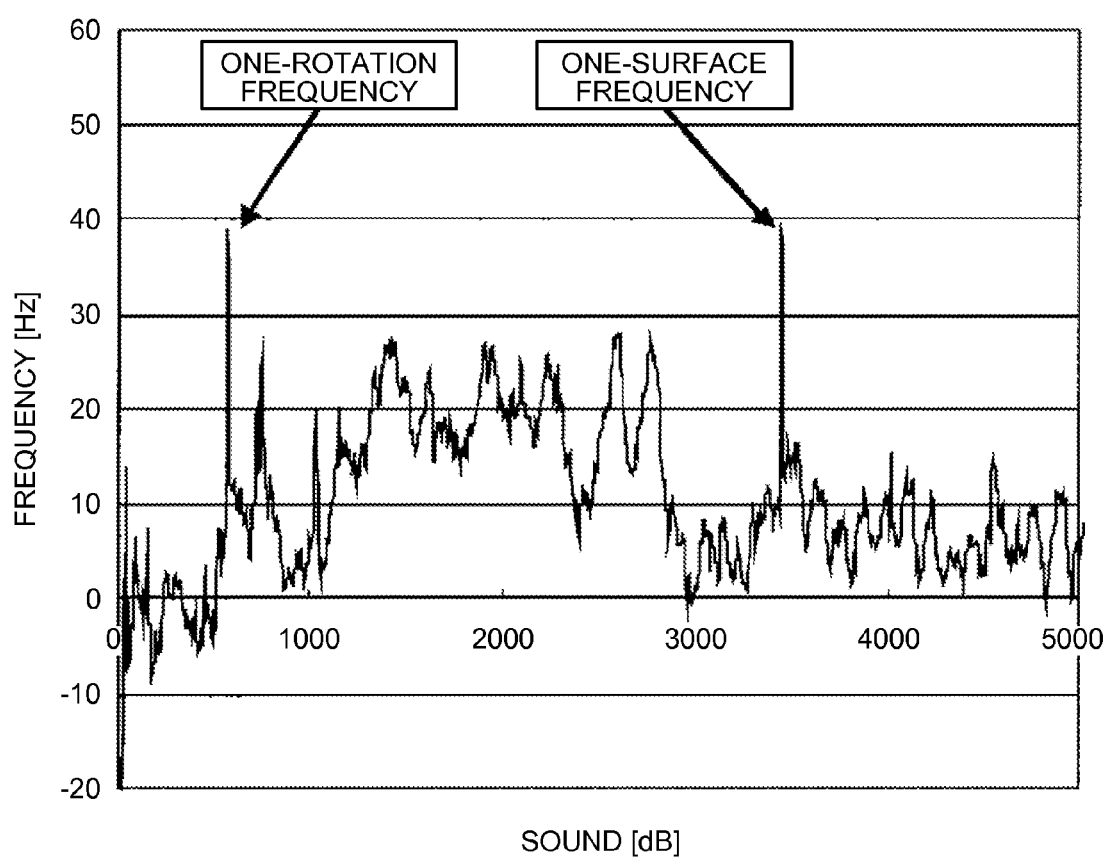
FIG. 2 is a graph showing the results of measurements of noises that occur when a polygon motor and a polygon mirror of the copier are rotated at 34000 rpm.

In the optical scanning device 47, the polygon scanner 120 in which the polygon motor 49 and the polygon mirror 48 are driven to rotate produces noises (sounds) that have a peak at a particular frequency dependent upon their rotational periods. FIG. 2 is a graph showing the results of measurements of sounds (noises) that occur when the polygon motor 49 and the polygon mirror 48 having a cubic shape are rotated at a speed of 34000 rpm. As illustrated, the noise produced by the polygon scanner 120 mainly includes the sound (sliding sound) of a one-rotation component (rotational frequency) of the polygon mirror 48 and the sound (wind noise) of a one-surface component (one-surface frequency) of the polygon mirror 48. These sounds propagate through the air inside the optical scanning device 47, then reach the housing of the optical scanning device 47, and thereafter propagate through the air outside the optical scanning device 47, thereby being noticed as noise. Under the condition of 34000 rpm, the one-rotation component noise is produced as the sound at a frequency of 566 [Hz], and the one-surface component noise is produced as the sound at a frequency of 3400 [Hz].

To take countermeasures against these noises, such a method is conceivable in which of the spaces inside the optical scanning device 47, the space for accommodating the polygon scanner 120 is sealed from the other spaces to create an enclosed space, thereby confining the noise in the enclosed space. However, in this method, the heat emitted from the polygon motor 49 may lead to an excessive increase in the temperature of the enclosed space, thereby causing various types of problems due to overheating.

On the other hand, to take countermeasures against the noise, another method is also conceivable in which the entire inside of the optical scanning device 47 is sealed as an enclosed space. However, in this method, good sealing effects cannot be obtained, and thus the noise emitted from the polygon scanner 120 may possibly be leaked out of the optical scanning device 47.

In this context, in the copier 500 according to the embodiment, the optical scanning device 47 is provided therein with a Helmholtz sound absorber as a resonator, so that the Helmholtz sound absorber resonates with the mirror one-rotation component noise and the mirror one-surface component noise so as to reduce the noises.

The Helmholtz sound absorber includes a resonance space of volume (V), and a resonance passage which has a length (L) and a cross-sectional area (S) and which allows the resonance space to communicate with the external space. The resonance frequency f of the Helmholtz sound absorber is expressed by Equation "$f=(c/2\pi)\cdot((S/V)\cdot(L+\delta))^{1/2}$," where V is the volume of the resonance space, L is the length of the resonance passage, S is the cross-sectional area of the resonance passage, c is the velocity of sound, and $\delta$ is the opening end correction value. The opening end correction value $\delta$ corrects the influence of resonance in the vicinity of the inlet of the resonance passage, and may typically take on about 0.5.

However, provision of such a Helmholtz sound absorber may possibly lead to the situation in which the airflow that is produced as the polygon mirror 48 rotates hits the inlet of the resonance passage of the Helmholtz sound absorber, thereby causing a whistle-like noise that sounds like a whistle. To reduce the whistle-like noise, provision of an additional Helmholtz sound absorber having a resonance frequency that is the same as the frequency of the whistle-like noise would lead to an increase in costs.

Now, a description will be made to a characteristic structure of the copier 500 according to the embodiment.

Figure 3:
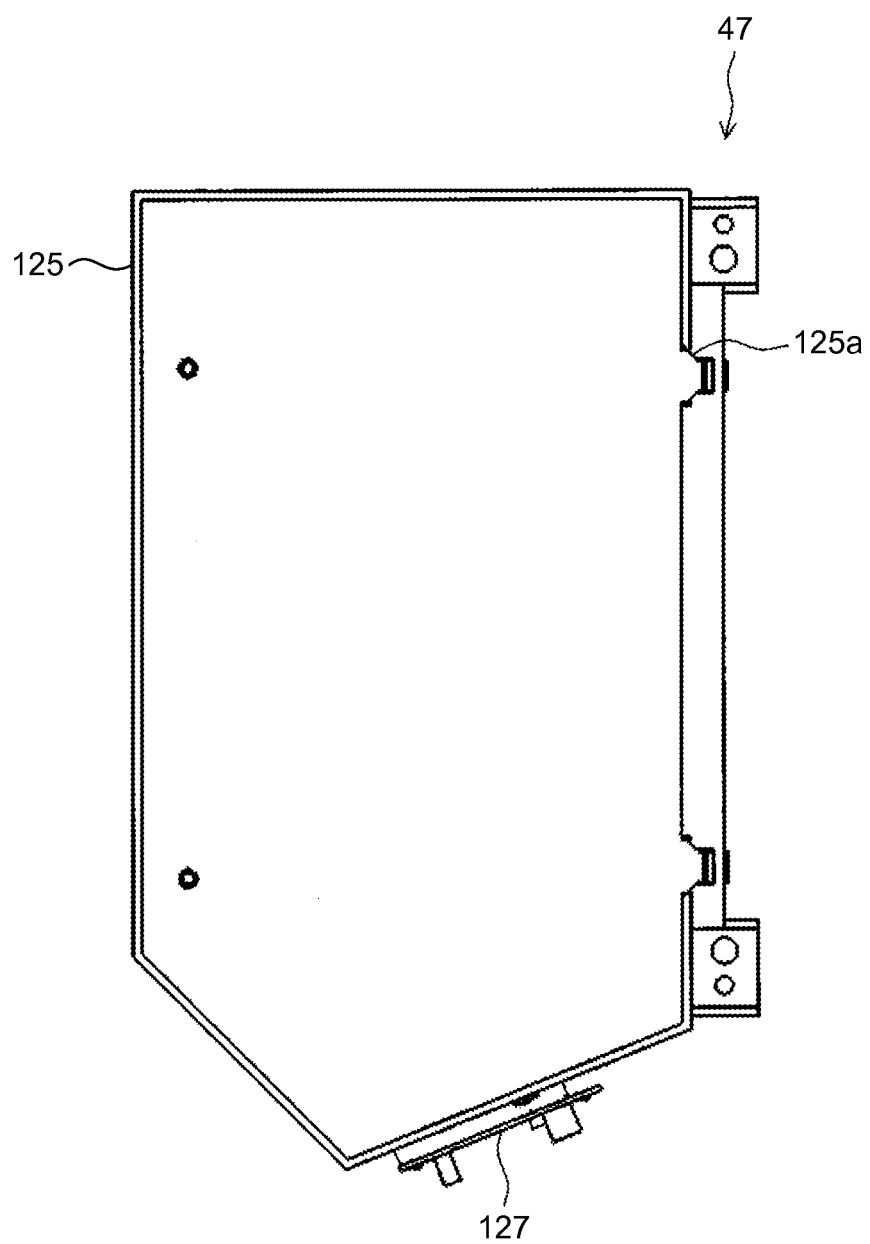
FIG. 3 is a plan view illustrating an optical scanning device of the copier.

FIG. 3 is a plan view illustrating the optical scanning device 47. The optical scanning device 47 has a housing 125 for accommodating various types of devices therein, and the housing 125 includes a body unit that includes a large opening for maintenance and inspection, and a cover 125a for closing the opening. The body unit (not shown) has an opening directed upwardly in the vertical direction, and the cover 125a (as illustrated) engages with the upper part of the body unit so as to cover the large opening. The body unit and the various types of devices that are accommodated in the body unit are hidden below the cover 125a in the figure.

Figure 4:
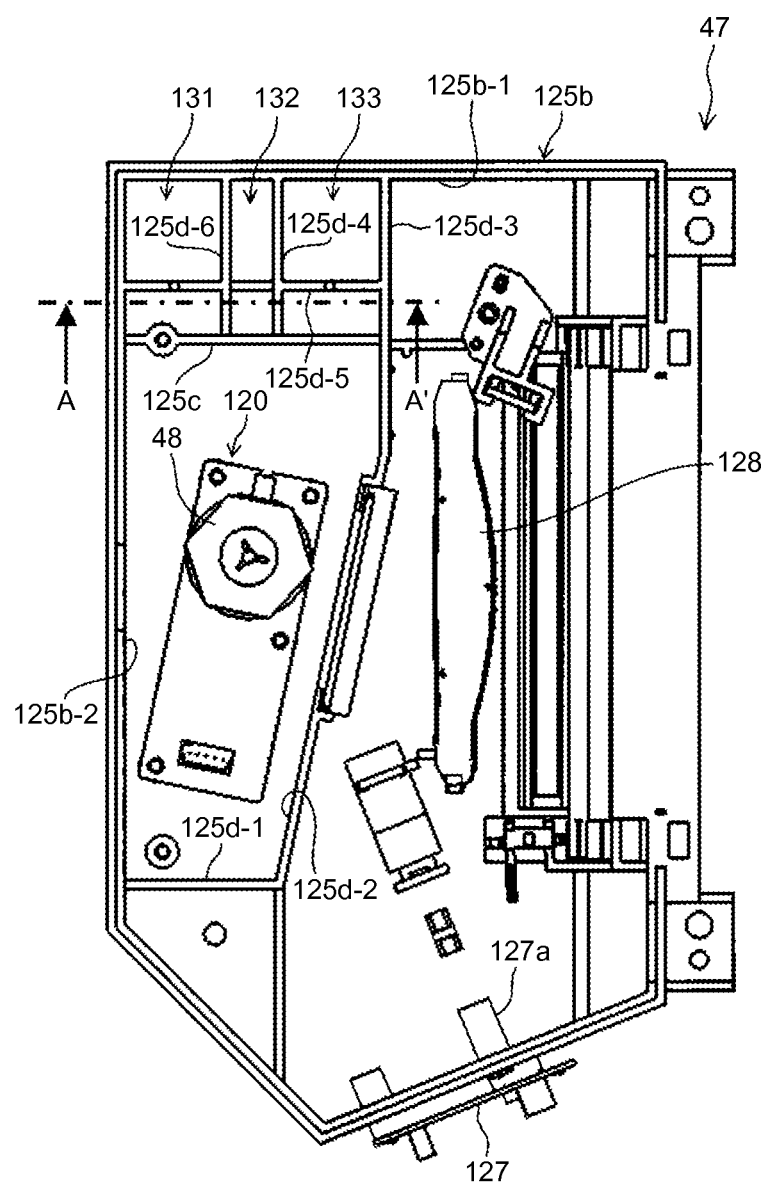
FIG. 4 is an exploded plan view illustrating the optical scanning device with a cover removed.

FIG. 4 is an exploded plan view illustrating the optical scanning device 47 with the cover removed. The polygon scanner 120 and a light emitting unit 127a of a laser light source 127 are disposed inside the body unit 125b of the housing 125. Also disposed are a compound lens 128 having both an f$\theta$ correction function and a tilt correction function, a first Helmholtz sound absorber 131, a second Helmholtz sound absorber 132, a third Helmholtz sound absorber 133, etc.

The first Helmholtz sound absorber 131, the second Helmholtz sound absorber 132, and the third Helmholtz sound absorber 133 are configured to resonate at a mutually different resonance frequency f. The resonance frequency f of any one of the Helmholtz sound absorbers is the same as the one-rotation frequency of the polygon mirror 48. On the other hand, one of the other two Helmholtz sound absorbers has the resonance frequency f that is the same as the one-surface frequency of the polygon mirror 48. Each of the resonance frequencies f has been adjusted to a desired value, for example, depending on the magnitude of the cross-sectional area S of the resonance passage (131a, 132a, or 133a), the length L of the resonance passage, and the volume V of the resonance space.

The polygon accommodating space as a deflection unit accommodating space which accommodates the polygon scanner 120 is partitioned from the surrounding space by being shielded with a plurality of walls listed below and the cover. That is, they are the bottom wall of the body unit 125b of the housing 125, the left wall 125b-2 of the body unit 125b, a first rib wall 125d-1 integrated with the body unit 125b, a second rib wall 125d-2, a partition wall 125c integrated with the body unit 125b, and the cover. Note that in the figure, although the cover is not illustrated because it has been removed, the cover is mounted onto the body unit as shown in FIG. 3, thereby serving as the ceiling wall of the polygon accommodating space.

Figure 5:
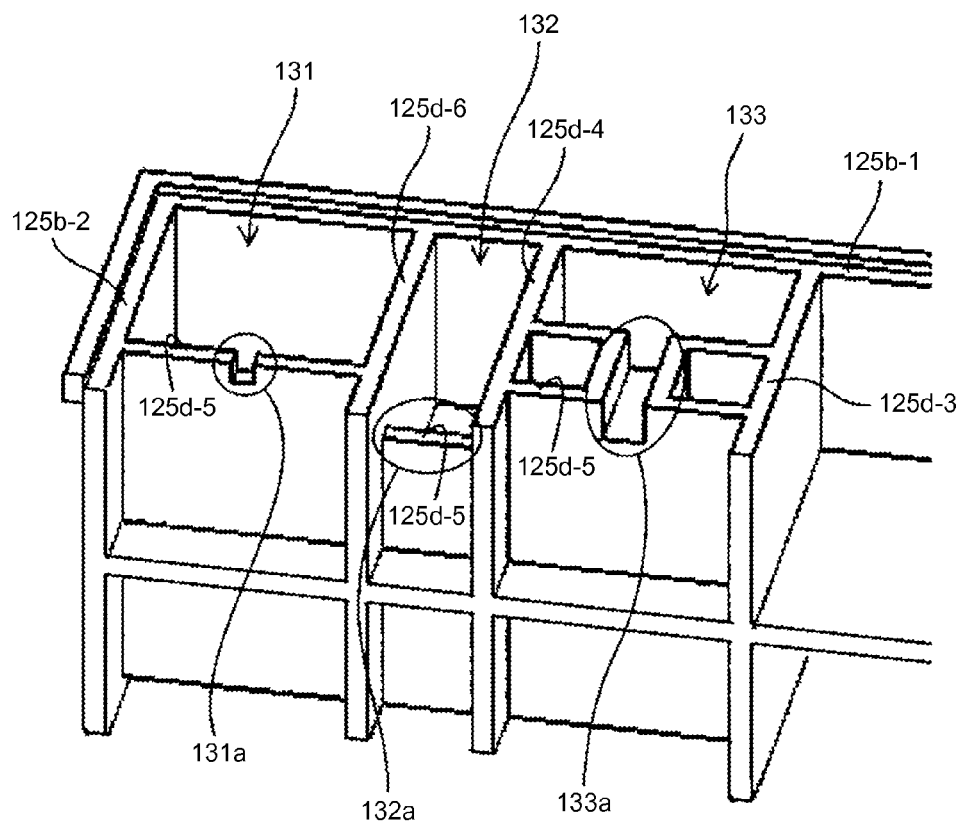
FIG. 5 is a perspective view taken along broken line A-A' of FIG. 4 and illustrating a cutaway portion of the optical scanning device.
Figure 6:
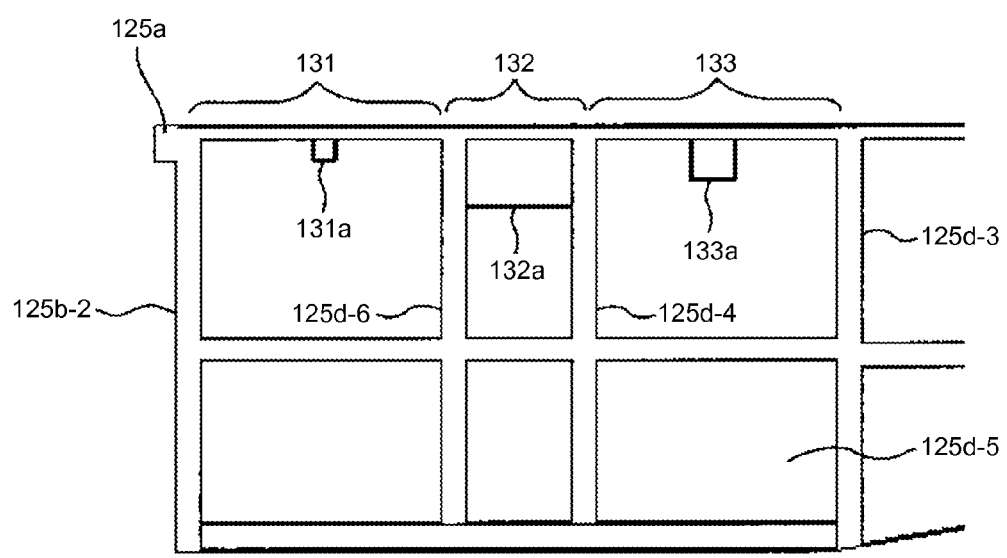
FIG. 6 is a front view illustrating the cutaway portion.
Figure 7:
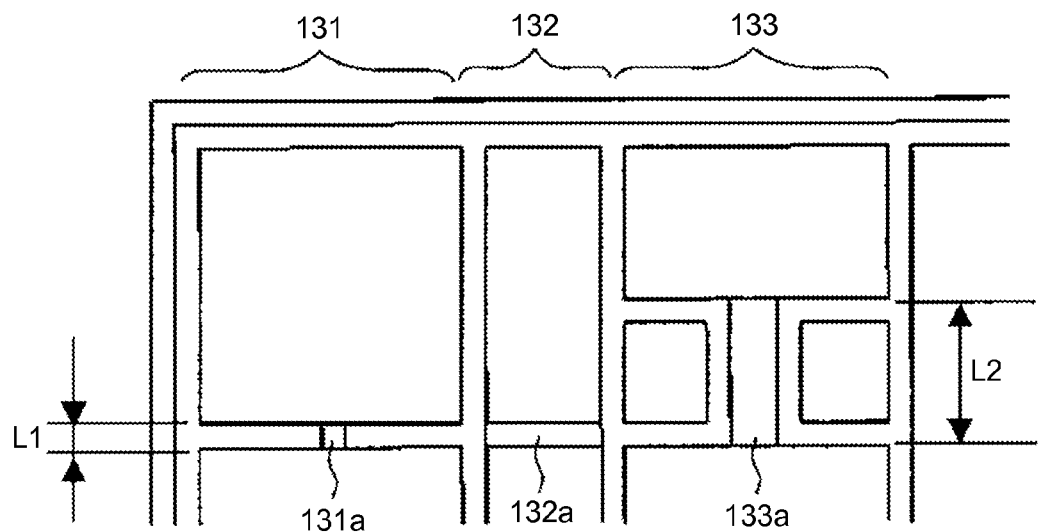
FIG. 7 is a plan view illustrating the cutaway portion with the cover removed.

FIG. 5 is a perspective view, taken along broken line A-A' of FIG. 4, illustrating a cutaway portion of the optical scanning device 47. Furthermore, FIG. 6 is a front view illustrating the cutaway portion. Furthermore, FIG. 7 is a plan view illustrating the cutaway portion with the cover removed. Note that FIG. 5 and FIG. 7 illustrate the cutaway portion with the cover removed, whereas FIG. 6 illustrates the cutaway portion with the cover 125a mounted. As shown in FIG. 6, the cover 125a forms the upper wall of a first resonance passage 131a of the first Helmholtz sound absorber 131, the upper wall of a second resonance passage 132a of the second Helmholtz sound absorber 132, and the upper wall of a third resonance passage 133a of the third Helmholtz sound absorber 133.

In FIG. 5, FIG. 6, and FIG. 7, the resonance space of the first Helmholtz sound absorber 131 (hereafter referred to as the first resonance space) is surrounded by a plurality of walls listed below and the cover. That is, they are the bottom wall of the body unit 125b of the housing 125, a rear wall 125b-1 of the body unit 125b, the left wall 125b-2 of the body unit 125b, a fifth rib wall 125d-5 integrated with the body unit 125b, a sixth rib wall 125d-6 integrated with the body unit 125b, and the cover. The bottom wall of the body unit 125b forms the bottom wall of the first resonance space. Furthermore, the rear wall 125b-1 of the body unit 125b forms the rear wall of the first resonance space. Furthermore, the left wall 125b-2 of the body unit 125b forms the left wall of the first resonance space. Furthermore, the fifth rib wall 125d-5 forms the front wall of the first resonance space. Furthermore, the sixth rib wall 125d-6 forms the right wall of the first resonance space. Furthermore, the cover (not shown) forms the ceiling wall of the first resonance space. The fifth rib wall 125d-5 is provided with a notch formed to serve as the first resonance passage 131a that communicates with the first resonance space, so that the first resonance space is connected to the air gap present in front thereof (hereafter referred to as the Helmholtz front air gap) through the first resonance passage 131a.

The resonance space of the second Helmholtz sound absorber 132 (hereafter referred to as the second resonance space) is surrounded by a plurality of walls listed below and the cover. That is, they are the bottom wall of the body unit 125b of the housing 125, the rear wall 125b-1 of the body unit 125b, the sixth rib wall 125d-6 integrated with the body unit 125b, the fifth rib wall 125d-5 integrated with the body unit 125b, a fourth rib wall 125d-4, and the cover. The bottom wall of the body unit 125b forms the bottom wall of the second resonance space. Furthermore, the rear wall 125b-1 of the body unit 125b forms the rear wall of the second resonance space. Furthermore, the sixth rib wall 125d-6 forms the left wall of the second resonance space. Furthermore, the fifth rib wall 125d-5 forms the front wall of the second resonance space. Furthermore, the fourth rib wall 125d-4 forms the right wall of the second resonance space. Furthermore, the cover (not shown) forms the ceiling wall of the second resonance space. The fifth rib wall 125d-5 is provided with a notch formed to serve as the second resonance passage 132a that communicates with the second resonance space, and the second resonance space is thus connected to the Helmholtz front air gap through the second resonance passage 132a.

The resonance space of the third Helmholtz sound absorber 133 (hereafter referred to as the third resonance space) is surrounded by a plurality of walls listed below and the cover. That is, they are the bottom wall of the body unit 125b of the housing 125, the rear wall 125b-1 of the body unit 125b, the fourth rib wall 125*d*-4 integrated with the body unit 125*b*, the fifth rib wall 125*d*-5 integrated with the body unit 125*b*, a third rib wall 125*d*-3, and the cover. The bottom wall of the body unit 125*b* forms the bottom wall of the third resonance space. Furthermore, the rear wall 125*b*-1 of the body unit 125*b* forms the rear wall of the third resonance space. Furthermore, the fourth rib wall 125*d*-4 forms the left wall of the third resonance space. Furthermore, the fifth rib wall 125*d*-5 forms the front wall of the third resonance space. Furthermore, the third rib wall 125*d*-3 forms the right wall of the third resonance space. Furthermore, the cover (not shown) forms the ceiling wall of the third resonance space. A plurality of internally formed rib walls are further provided inside the region surrounded by the rear wall, the left wall, the front wall, and the right wall, so that these internally formed rib walls and the front wall form a separated small space, thereby adjusting the volume of the third resonance space. The third resonance space is connected to the Helmholtz front air gap through the third resonance passage 133*a*.

In FIG. 4, the partition wall 125*c* is connected between the left wall 125*b*-2 of the body unit 125*b* of the housing 125 and the third rib wall 125*d*-3. The partition wall 125*c* has the same height as that of the left wall 125*b*-2. The partition wall 125*c* functions as the rear wall of the polygon accommodating space for accommodating the polygon scanner 120 and provides a partition between the polygon accommodating space and the Helmholtz accommodating space for accommodating the three Helmholtz sound absorbers (131 to 133). This causes the polygon accommodating space not to communicate with the Helmholtz accommodating space acting as the resonator accommodating space. Noises produced in the polygon accommodating space by the rotating polygon mirror 48 and the polygon motor 49 reach the inlet of the first resonance space, the inlet of the second resonance space, and the inlet of the third resonance space via the partition wall 125*c* and the Helmholtz front air gap.

In such a structure, even when an airflow is produced by the rotating polygon mirror 48 in the polygon accommodating space, the airflow will not reach the Helmholtz accommodating space because the airflow is blocked by the partition wall 125*c*. Thus, it is possible to prevent the airflow from producing whistle-like noises at each of the inlets of the first resonance space, the second resonance space, and the third resonance space, the inlets being present in the Helmholtz accommodating space. It is thus possible to avoid increase in noise due to the whistle-like noise. Furthermore, since the occurrence of the whistle-like noise can be prevented without providing an additional Helmholtz sound absorber for reducing the whistle-like noise, it is possible to avoid increase in costs due to the provision of the additional Helmholtz sound absorber. Furthermore, it is possible to cut costs by using the cover 125*a* also as the respective upper wall of the three Helmholtz sound absorbers. Furthermore, it is possible to cut costs by using the rib wall also as the sidewall of the Helmholtz sound absorbers.

Figure 8:
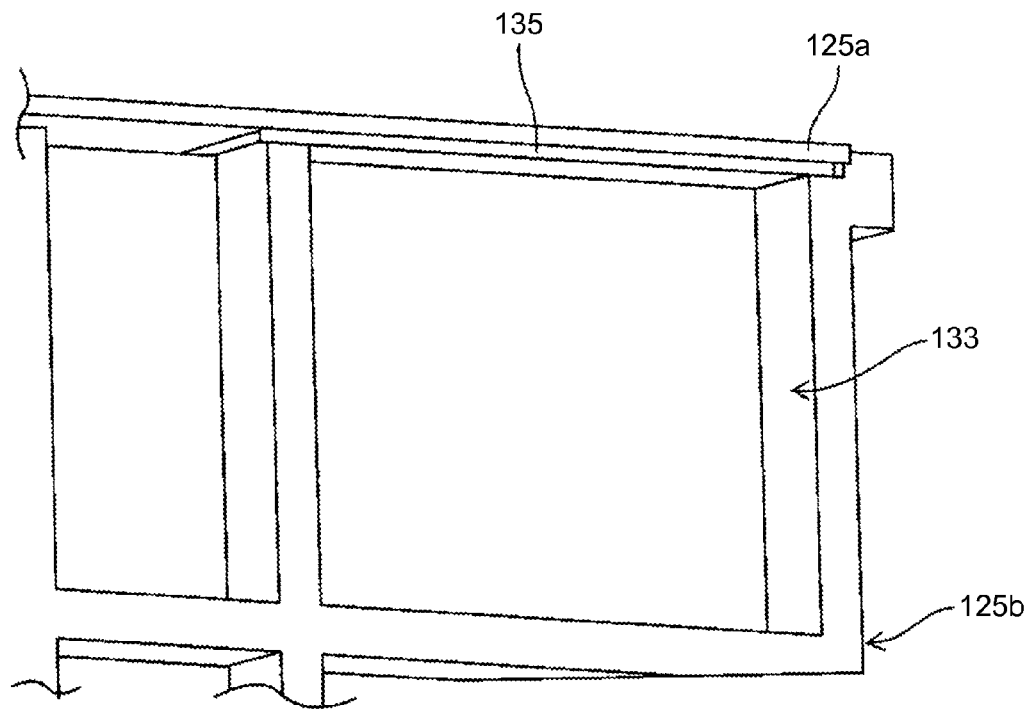
FIG. 8 is a perspective side view illustrating the cutaway portion.

FIG. 8 is a perspective side view illustrating the aforementioned cutaway portion. In the figure, there is an elastically deformable sealing member 135 affixed to the rear surface of the cover 125*a*. With the cover 125*a* mounted on the body unit 125*b* of the housing 125, the sealing member 135 is interposed between the four rising walls of the third Helmholtz sound absorber 133 and the cover 125*a*. More specifically, the four rising walls are the front wall, the rear wall, the left wall, and the right wall. Those four rising walls are integrated with the bottom wall, thus forming no gap between the rising walls and the bottom wall. In contrast to this, the rising walls are not integrated with the cover, thereby possibly causing a gap between the four walls and the cover 125*a*, for example, due to a size error in each part that may be caused during molding. The occurrence of the gap may prevent the Helmholtz sound absorber from resonating in an appropriate manner, thereby possibly leading to degradation in the sound absorption efficiency. In this context, the sealing member 135 is employed to prevent the occurrence of a gap.

Note that the sealing member 135 is also interposed between the four rising walls of the first Helmholtz sound absorber (not shown) and the cover 125*a*, and between the four rising walls of the second Helmholtz sound absorber and the cover 125*a*. On the entire region of the rear surface of the cover 125*a*, the sealing member 135 is affixed only to the region opposed to the three Helmholtz sound absorbers; however, the sealing member 135 may also be affixed to the region opposed to the partition wall (125*c*). This makes it possible to prevent the leakage of airflow from the polygon accommodating space to the Helmholtz accommodating space through the gap between the partition wall and the cover 125*a*.

Figure 9:
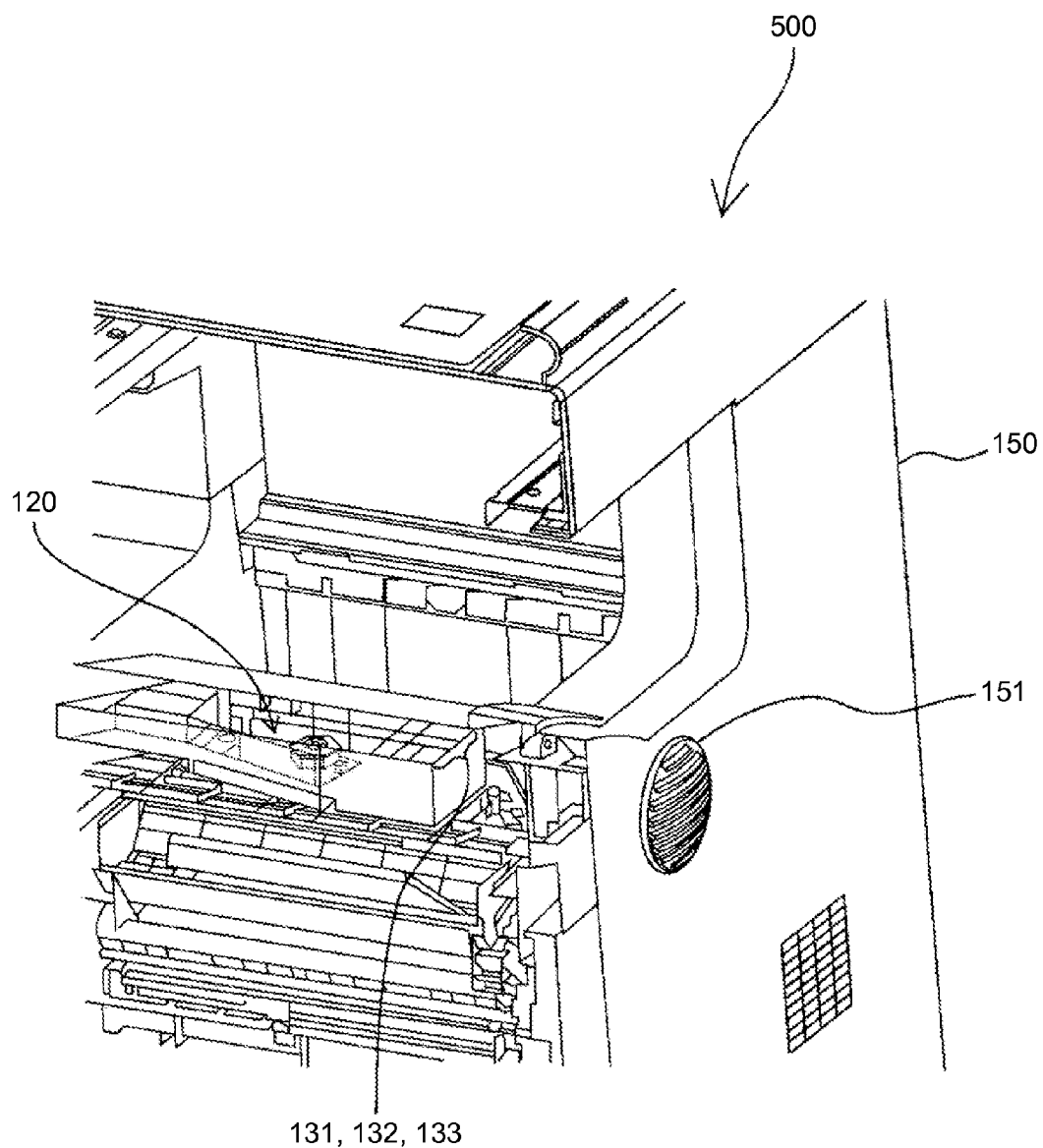
FIG. 9 is a partially exploded perspective view illustrating part of the copier.
Figure 10:
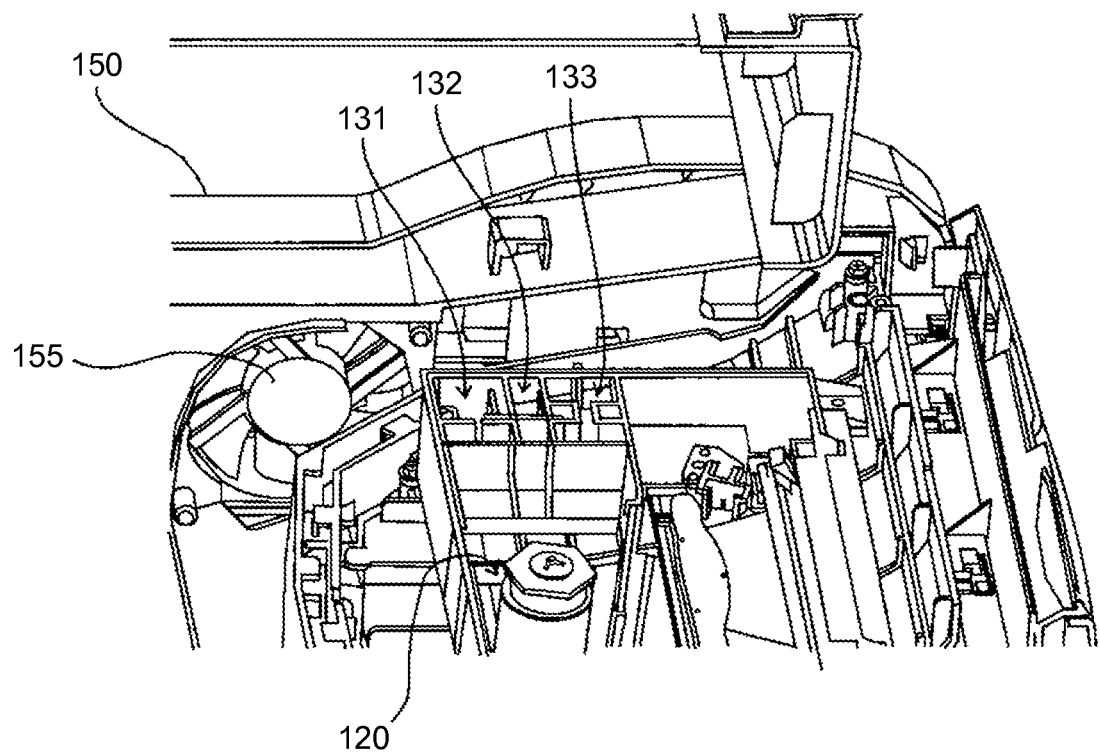
FIG. 10 is a partially exploded perspective view illustrating the part when viewed in another direction.

FIG. 9 is a partially exploded perspective view illustrating part of the copier 500 according to the embodiment. In the rear plate 150 of the casing cover of the copier 500, a ventilation opening is formed, which is covered with a louver 151. Furthermore, as shown in FIG. 10, the rear plate 150 of the casing cover of the copier 500 has the rear surface to which an exhaust gas fan 155 is secured, so that while drawing the air inside the copier, the exhaust gas fan 155 discharges the air to the ventilation opening. This allows the air inside the copier to be discharged out of the copier through the ventilation opening and the slits of the louver 151. Facilitating the discharge of the air avoids excessive increase in the temperature inside the copier.

However, there is a possibility that part of noise produced in the polygon scanner 120 may not be absorbed by the Helmholtz sound absorber and thus leak out of the copier through the ventilation opening provided in the rear plate of the casing cover. In this context, the copier 500 according to the embodiment is provided with the Helmholtz sound absorbers as shown in FIG. 9 and FIG. 10. More specifically, the first Helmholtz sound absorber 131, the second Helmholtz sound absorber 132, and the third Helmholtz sound absorber 133 are interposed between the polygon scanner 120 acting as the deflection unit and the ventilation opening provided in the rear plate of the casing cover. This makes it possible to prevent the leakage of noise through the ventilation opening by allowing the Helmholtz sound absorbers to actively absorb the noise directed from the polygon scanner 120 toward the ventilation opening.

The embodiment was described above by way of example, and the present invention provides unique effects for each aspect below.

Aspect A

Aspect A relates to an optical scanning device (for example, the optical scanning device 47) which includes: deflection unit (for example, the polygon scanner 120) for allowing a deflection mirror (for example, the polygon mirror 48) driven by a driving source (for example, the polygon motor 49) to deflect the travel direction of light emitted from a light source (for example, the laser light source 127); a resonator (for example, the first Helmholtz sound absorber 131, the second Helmholtz sound absorber 132, and the third Helmholtz sound absorber 133) that includes a resonance space for reducing noise emitted from the deflection unit and a resonance passage (for example, 131*a*, 132*a*, 133*a*) communicating with the resonance space to direct noise from outside to inside the resonance space; and a housing (for example, housing 125) for accommodating the deflection unit and the resonator, the optical scanning device performing optical scanning across an object to be scanned with the light deflected by the deflection unit, the optical scanning device being characterized in that a partition wall (for example, the partition wall 125c) partitions between a deflection unit accommodating space (for example, the polygon accommodating space) acting as a space for accommodating the deflection unit in the housing and a resonator accommodating space (for example, the Helmholtz accommodating space) acting as a space for accommodating the resonator in the housing; and a noise produced in the deflection unit accommodating space is allowed to reach the inlet of the resonance passage of the resonator via the partition wall and an air gap in the resonator accommodating space.

In such a structure, the partition wall partitioning between the deflection unit accommodating space and the resonator accommodating space prevents the entry of airflow produced in the deflection unit accommodating space into the resonator accommodating space. This prevents the occurrence of a whistle-like noise in the vicinity of the resonance passage inlet of the resonator due to airflow produced in the deflection unit accommodating space, thus avoiding increase in noise resulting from the whistle-like noise. Furthermore, since the occurrence of the whistle-like noise can be prevented without providing an additional resonator for reducing the whistle-like noise, it is possible to avoid increase in costs caused by the provision of the additional resonator.

Aspect B

Aspect B relates to the optical scanning device of Aspect A, characterized in that a space accommodating the deflection unit in the housing and a space accommodating the resonator in the housing do not communicate with each other. In such a structure, the entry of airflow from the former space to the latter space is perfectly shut out, thereby ensuring avoidance of increase in noise due to the whistle-like noise.

Aspect C

Aspect C relates to the optical scanning device of Aspect B, characterized in that part of a rising wall of the housing is also used as a rising wall of the resonator. In such a structure, the walls are shared, thereby allowing for cutting costs.

Aspect D

Aspect D relates to the optical scanning device of Aspect B or C, characterized in that a rib of the housing is also used as a rising wall of the resonator. In such a structure, the wall is also shared, thereby cutting costs.

Aspect E

Aspect E relates to the optical scanning device of any of Aspects B to D, characterized in that the housing employed has a body unit (for example, the body unit 125b) that includes an opening for maintenance and inspection, and a cover (for example, the cover 125a) for closing the opening of the body unit, and an elastically deformable sealing member (for example, the sealing member 135) that is interposed between the cover and the rising wall of the resonator is provided. In such a structure, a gap between the rising wall of the resonator and the cover is sealed with the sealing member. This makes it possible to avoid degradation in the sound absorption effects of the resonator which may be caused by the occurrence of the gap between the rising wall of the resonator and the cover due to size error of each part of the body unit and the cover.

Aspect F

Aspect F relates to the optical scanning device of any of Aspects A to E, characterized in that as the resonator, a plurality of resonators having mutually different resonance frequencies are provided, and the partition wall partitions between the space accommodating all those resonators in the housing and the space accommodating the deflection unit in the housing. In such a structure, at least the noise of the same frequency as that of one-rotation period of the deflection mirror and the noise of the same period as the one-surface period of the deflection mirror can be mainly absorbed by the mutually different resonators.

Aspect G

Aspect G relates to the optical scanning device of Aspect F, characterized in that for the plurality of resonators, at least one of the volume of the resonance spaces, the cross-sectional area of the resonance passages, and the length of the resonance passages takes on mutually different values. In such a structure, the resonance frequencies of the resonators can be made different from each other by a simple method of adjusting at least any one of the volume of the mirror surface spaces, the cross-sectional area of the resonance passages, and the length of the mirror surface passage.

Aspect H

Aspect H relates to an image forming apparatus (for example, the copier 500) including: a photoconductor (for example, the photoconductor 10); optical scanning means for forming a latent image on the photoconductor by optical scanning; and developing means (for example, the developing device 12) for developing the latent image, the image forming apparatus being characterized in that used as the optical scanning means is the optical scanning device (for example, the optical scanning device 47) according to any of the aspects A to G. In such a structure, while an increase in noise due to the occurrence of a whistle-like noise in the optical scanning device 47 is being avoided, an increase in costs caused by providing an additional resonator for reducing the whistle-like noise can be avoided.

Aspect I

Aspect I relates to the image forming apparatus of Aspect H, characterized in that the resonator is interposed between the deflection unit and the ventilation opening provided in the casing cover of the image forming apparatus. In such a structure, the noise directed from the deflection unit of the optical scanning device toward the ventilation opening of the casing cover is actively absorbed halfway by the resonator, thereby preventing the leakage of noise through the ventilation opening.

The present invention provides the outstanding effects that make it possible to avoid an increase in costs caused by an additional resonator to be provided to reduce the whistle-like noise while an increase in noise due to the whistle-like noise produced at the inlet of the resonance passage of the resonator is being avoided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that performs optical scanning across an object to be scanned with a light deflected, the optical scanning device comprising:
 a deflection unit that causes a deflection mirror driven by a driving source to deflect a travel direction of light emitted from a light source and generates the light deflected;
 a resonator that includes a resonance space for reducing sound emitted from the deflection unit and a resonance passage communicating with the resonance space to direct sound from outside to inside the resonance space;
 a housing that accommodates the deflection unit and the resonator; and a partition wall that partitions a deflection unit accommodating space acting as a space for accommodating the deflection unit in the housing and a resonator accommodating space acting as a space for accommodating the resonator in the housing, the partition wall allowing that sound produced in the deflection unit accommodating space to reach an inlet of the resonance passage of the resonator via the partition wall and an air gap in the deflector accommodating space, wherein
the space for accommodating the deflection unit in the housing and the space for accommodating the resonator in the housing do not communicate with each other.

2. The optical scanning device according to claim 1, wherein
each of the housing and the resonator includes a rising wall respectively, and a part of the rising wall of the housing is also used as the rising wall of the resonator.

3. The optical scanning device according to claim 1, wherein
the housing includes a rib, the resonator includes a rising wall, and the rib of the housing is also used as the rising wall of the resonator.

4. The optical scanning device according to claim 1, wherein
the housing has a body unit which includes an opening for maintenance and inspection, and a cover for closing the opening of the body unit, and
the optical scanning device further includes an elastically deformable sealing member that is interposed between the cover and the rising wall of the resonator.

5. The optical scanning device according to claim 1, wherein
a plurality of resonators having mutually different resonance frequencies are provided as the resonator, and
the partition wall partitions between a space for accommodating all those resonators in the housing and the space for accommodating the deflection unit in the housing.

6. The optical scanning device according to claim 5, wherein
for the plurality of resonators, at least one of a volume of the resonance space, a cross-sectional area of the resonance passage, and a length of the resonance passage takes on mutually different values.

7. An image forming apparatus comprising:
a photoconductor;
the optical scanning device of claim 1, for forming a latent image on the photoconductor by optical scanning; and
a developing device for developing the latent image.

8. The image forming apparatus according to claim 7, wherein
the resonator is interposed between the deflection unit and a ventilation opening provided in a casing cover of the image forming apparatus.

9. An optical scanning device that performs optical scanning across an object to be scanned with a light defected, the optical scanning device comprising:
a deflection unit that causes a deflection mirror driven by a driving source to deflect the travel direction of light emitted from a light source and generates the light deflected;
a resonator that includes a resonance space surrounded by walls and a passage that permits the resonance space to communicate with outside, the passage being formed on a wall faced to the deflection mirror among the walls;
a housing that accommodates the deflection unit and the resonator; and
a partition wall that is formed between the wall having the passage and a deflection unit accommodating space acting as a space for accommodating the deflection unit in the housing.

10. The optical scanning device according to claim 9, wherein the height of the partition wall is the same as that of walls beside the wall having the passage.

11. An image forming apparatus comprising:
a photoconductor;
the optical scanning device of claim 9, for forming a latent image on the photoconductor by optical scanning; and
a developing device for developing the latent image.

12. The image forming apparatus according to claim 11, wherein the resonator is interposed between the deflection unit and a ventilation opening provided in a casing cover of the image forming apparatus.

* * * * *